(12) United States Patent
Yuk et al.

(10) Patent No.: US 9,912,403 B2
(45) Date of Patent: Mar. 6, 2018

(54) APPARATUS FOR TRANSCEIVING SIGNALS IN ACCORDANCE WITH A FRAME STRUCTURE SUPPORTIVE OF A PLURALITY OF CARRIERS IN A WIRELESS COMMUNICATION SYSTEM AND METHOD THEREOF

(71) Applicant: LG ELECTRONICS INC., Seoul (KR)

(72) Inventors: Youngsoo Yuk, Anyang-si (KR); Jaehoon Chung, Anyang-si (KR); Hyunsoo Ko, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/408,912

(22) PCT Filed: Jun. 17, 2013

(86) PCT No.: PCT/KR2013/005311
§ 371 (c)(1),
(2) Date: Dec. 17, 2014

(87) PCT Pub. No.: WO2013/191419
PCT Pub. Date: Dec. 27, 2013

(65) Prior Publication Data
US 2015/0180569 A1 Jun. 25, 2015

Related U.S. Application Data

(60) Provisional application No. 61/664,760, filed on Jun. 27, 2012, provisional application No. 61/660,791, filed on Jun. 17, 2012.

(51) Int. Cl.
*H04L 5/00* (2006.01)
*H04W 40/00* (2009.01)
(Continued)

(52) U.S. Cl.
CPC ......... *H04B 7/2656* (2013.01); *H04B 7/2643* (2013.01); *H04L 5/001* (2013.01);
(Continued)

(58) Field of Classification Search
CPC ............... H04W 52/146; H04W 4/005; H04W 72/0406; H04W 72/04; H04W 72/082;
(Continued)

(56) References Cited

U.S. PATENT DOCUMENTS

| 2007/0025290 A1 | 2/2007 | Afrashteh et al. |
| 2007/0097897 A1 | 5/2007 | Teague et al. |

(Continued)

FOREIGN PATENT DOCUMENTS

| CN | 101686103 | 3/2010 |
| CN | 101843009 | 9/2010 |

(Continued)

OTHER PUBLICATIONS

European Patent Office Application Serial No. 13807327.5, Search Report dated Jan. 27, 2016, 8 pages.

(Continued)

*Primary Examiner* — Edan Orgad
*Assistant Examiner* — Vanneilian Lalchinthang
(74) *Attorney, Agent, or Firm* — Lee Hong Degerman Kang Waimey

(57) ABSTRACT

Apparatus for transceiving signals in accordance with a frame structure supportive of a plurality of carriers in a wireless communication system and method thereof are disclosed. The method includes transceiving the signal using at least one carrier in accordance with the frame structure supportive of the carriers. The frame structure includes the carriers. First carrier among the carriers includes a downlink static assignment region assigned statically for a user equipment to receive the signal from a base station, a downlink (Continued)

dynamic assigned region assigned in a manner of being flexibly changed and an uplink transmitting region for the user equipment to transmit an uplink signal. Second carrier among the carriers includes an uplink transmitting region for the user equipment to transmit the uplink signal. The first or second carrier includes an uplink static assignment region assigned statically for an uplink transmission of the user equipment.

12 Claims, 9 Drawing Sheets

(51) Int. Cl.
  *H04W 72/04* (2009.01)
  *H04J 1/00* (2006.01)
  *H04B 7/26* (2006.01)
  *H04L 5/14* (2006.01)
  *H04W 72/12* (2009.01)
  *H04W 72/08* (2009.01)

(52) U.S. Cl.
  CPC .......... *H04L 5/0069* (2013.01); *H04L 5/0073* (2013.01); *H04L 5/14* (2013.01); *H04L 5/1469* (2013.01); *H04W 72/0426* (2013.01); *H04W 72/0446* (2013.01); *H04W 72/0453* (2013.01); *H04W 72/1268* (2013.01); *H04L 5/0048* (2013.01); *H04W 72/082* (2013.01)

(58) Field of Classification Search
  CPC ......... H04W 72/0453; H04W 72/0426; H04W 72/1268; H04L 5/0044; H04L 5/001; H04L 5/0048; H04L 5/0073; H04L 5/14; H04J 1/00; H04B 7/26; H04B 7/2643
  USPC ........................................................ 370/278
  See application file for complete search history.

(56) References Cited

U.S. PATENT DOCUMENTS

| | | | |
|---|---|---|---|
| 2008/0043710 A1 | 2/2008 | Zhou et al. | |
| 2008/0144530 A1 | 6/2008 | Che et al. | |
| 2009/0067377 A1* | 3/2009 | Talukdar | H04L 5/0048 370/329 |
| 2009/0180459 A1 | 7/2009 | Orlik et al. | |
| 2009/0185632 A1* | 7/2009 | Cai | H04L 5/0044 375/260 |
| 2009/0201838 A1 | 8/2009 | Zhang et al. | |
| 2009/0213769 A1 | 8/2009 | Shen et al. | |
| 2009/0238155 A1 | 9/2009 | Sun | |
| 2010/0008332 A1 | 1/2010 | Balachandran et al. | |
| 2010/0027446 A1 | 2/2010 | Choi et al. | |
| 2010/0220597 A1 | 9/2010 | Ji et al. | |
| 2010/0246531 A1* | 9/2010 | Chang | H04W 28/06 370/331 |
| 2011/0096783 A1 | 4/2011 | Cai et al. | |
| 2011/0141996 A1* | 6/2011 | Yamada | H04W 72/0453 370/329 |
| 2011/0211503 A1 | 9/2011 | Che et al. | |
| 2011/0261776 A1 | 10/2011 | Ahn et al. | |
| 2011/0274014 A1 | 11/2011 | Du et al. | |
| 2012/0002577 A1* | 1/2012 | Ishii | H04W 72/082 370/281 |
| 2012/0082071 A1 | 4/2012 | Lv et al. | |
| 2012/0182950 A1 | 7/2012 | Chung et al. | |
| 2012/0263079 A1 | 10/2012 | Struhsaker | |
| 2013/0028205 A1* | 1/2013 | Damnjanovic | H04L 5/001 370/329 |
| 2013/0121189 A1 | 5/2013 | Bhattad et al. | |
| 2013/0235754 A1* | 9/2013 | Lim | H04W 72/042 370/252 |
| 2013/0272170 A1* | 10/2013 | Chatterjee | H04W 28/02 370/280 |
| 2013/0315196 A1* | 11/2013 | Lim | H04L 1/1854 370/329 |
| 2014/0161003 A1 | 6/2014 | Han et al. | |
| 2015/0085797 A1* | 3/2015 | Ji | H04J 3/16 370/329 |
| 2015/0162979 A1 | 6/2015 | Yuk et al. | |
| 2015/0173048 A1* | 6/2015 | Seo | H04W 72/1247 370/329 |

FOREIGN PATENT DOCUMENTS

| | | | |
|---|---|---|---|
| CN | 101855880 | 10/2010 | |
| CN | 101904125 | 12/2010 | |
| CN | 101933283 | 12/2010 | |
| CN | 102025411 | 4/2011 | |
| CN | 102215534 | 10/2011 | |
| WO | 2011/025333 | 3/2011 | |
| WO | 2011044166 | 4/2011 | |
| WO | 2011/154030 | 12/2011 | |
| WO | WO 2011/154030 A2 * | 12/2011 | .......... H04L 5/0007 |

OTHER PUBLICATIONS

PCT International Application No. PCT/KR2013/005311, Written Opinion of the International Searching Authority dated Sep. 27, 2013, 10 pages.
European Patent Office Application Serial No. 13806091.8, Search Report dated Jan. 27, 2016, 8 pages.
U.S. Appl. No. 14/408,532, Office Action dated May 13, 2016, 32 pages.
PCT International Application No. PCT/KR2013/005314, Written Opinion of the International Searching Authority dated Oct. 1, 2013, 10 pages.
The State Intellectual Property Office of the People's Republic of China Application Serial No. 201380032005.6, Office Action dated Jan. 5, 2017, 6 pages.
State Intellectual Property Office of the People's Republic of China Application Serial No. 201380031991.3, Office Action dated Mar. 3, 2017, 16 pages.
U.S. Appl. No. 14/408,532, Office Action dated Jul. 28, 2017, 32 pages.
State Intellectual Property Office of the People's Republic of China Application Serial No. 201380031991.3, Office Action dated Sep. 27, 2017, 11 pages.

* cited by examiner

APPARATUS FOR TRANSCEIVING SIGNALS IN ACCORDANCE WITH A FRAME STRUCTURE SUPPORTIVE OF A PLURALITY OF CARRIERS IN A WIRELESS COMMUNICATION SYSTEM AND METHOD THEREOF

CROSS-REFERENCE TO RELATED APPLICATIONS

This application is the National Stage filing under 35 U.S.C. 371 of International Application No. PCT/KR2013/005311, filed on Jun. 17, 2013, which claims the benefit of U.S. Provisional Application Ser. No. 61/660,791, filed on Jun. 17, 2012, and 61/664,760, filed on Jun. 27, 2012, the contents of which are all hereby incorporated by reference herein in their entirety.

TECHNICAL FIELD

The present invention relates to a wireless communication system, and more particularly, to an apparatus for transceiving signals in accordance with a frame structure supportive of a plurality of carriers in a wireless communication system and method thereof.

BACKGROUND ART

Generally, a frame structure of a mobile communication system has a static structure and is configured through a centralized scheduling of a base station. This current frame structure of the static type may facilitate a control of interference and the like but has low efficiency due to its inflexible frame structure.

Particularly, when a multitude of small cells exist like HetNet, if cells differ from each other in use pattern due to the small number of users per cell or such a new distributive communication method as D2D (device to device) is applied, a corresponding efficiency is considerably lowered.

However, a new frame structure capable of applying both inter-cell interference and such a new distributive communication method as D2D has not been proposed yet.

Technical Task

One technical task of the present invention is to provide a method of transceiving signals in accordance with a frame structure supportive of a plurality of carriers in a wireless communication system.

Another technical task of the present invention is to provide an apparatus for transceiving signals in accordance with a frame structure supportive of a plurality of carriers in a wireless communication system.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of transceiving signals in accordance with a frame structure supportive of a plurality of carriers in a wireless communication system, includes transceiving the signals using at least one carrier in accordance with the frame structure supportive of the plurality of the carriers, wherein the frame structure includes a plurality of the carriers, wherein a first carrier among the plurality of the carriers includes a downlink static assignment region assigned statically for a user equipment to receive the signals from a base station, a downlink dynamic assigned region assigned in a manner of being flexibly changed and an uplink transmitting region for the user equipment to transmit an uplink signal, wherein a second carrier among the plurality of the carriers includes an uplink transmitting region for the user equipment to transmit the uplink signal, and wherein either the first carrier or the second carrier includes an uplink static assignment region assigned statically for an uplink transmission of the user equipment. Preferably, the downlink static assignment region in the frame structure and a downlink static assignment region in a frame structure supported by at least one base station corresponding to a neighbor base station neighbor to the base station are assigned not to overlap with each other in a time domain. More preferably, the uplink static assignment region in the frame structure is assigned not to overlap with an uplink static assignment region in the frame structure supported by the at least one base station corresponding to the neighbor base station neighbor to the base station. Preferably, the uplink static assignment region is located in the middle of a band of either the first carrier or the second carrier. Preferably, the uplink transmitting region in the second carrier corresponds to a region for the user equipment successful in a ranging via the uplink static assignment region to transmit the signal. Preferably, the uplink transmitting region includes a region for which a maximum transmit power level of the user equipment is set different per subchannel or resource block (RB). More preferably, the user equipment performs the signal transmission in the uplink transmitting region with a level lower than the maximum transmit power level set per the subchannel or the resource block. Preferably, the uplink transmitting region corresponds to a region available for a direct communication between user equipments.

To further achieve these and other advantages and in accordance with the purpose of the present invention, an apparatus for transceiving signals in accordance with a frame structure supportive of a plurality of carriers in a wireless communication system, includes a transceiver and a processor, the processor is configured to control that the transceiver transceives the signals using at least one carrier in accordance with the frame structure supportive of the plurality of the carriers, wherein the frame structure includes the plurality of the carriers, wherein a first carrier among a plurality of the carriers includes a downlink static assignment region assigned statically for a user equipment to receive the signal from a base station, a downlink dynamic assigned region assigned in a manner of being flexibly changed and an uplink transmitting region for the user equipment to transmit an uplink signal, wherein a second carrier among the plurality of the carriers includes an uplink transmitting region for the user equipment to transmit the uplink signal, and wherein either the first carrier or the second carrier includes an uplink static assignment region assigned statically for an uplink transmission of the user equipment. Preferably, the uplink transmitting region in the second carrier corresponds to a region for the user equipment successful in a ranging via the uplink static assignment region to transmit the signal. Preferably, the uplink transmitting region includes a region for which a maximum transmit power level of the user equipment is set different per subchannel or resource block (RB). More preferably, the processor controls the signal transmission in the uplink transmitting region to be performed with a level lower than the maximum transmit power level set per the subchannel or the resource block. Preferably, the uplink transmitting region corresponds to a region available for a direct communication between user equipments.

The above-mentioned general description of the present invention and the following details of the present invention are exemplary and may be provided for the additional description of the invention disclosed in claims.

Advantageous Effects

Accordingly, the present invention may provide the following effects and/or features.

First of all, according to various embodiments of the present invention, inter-cell interference can be efficiently controlled in accordance with designs of various frame structures including the above-described frame structure for avoiding the inter-cell interference. In particular, when a multitude of small cells exist like HetNet, as the number of users per cell is decreased, if an inter-cell use pattern is different or such a new distributive communication method as D2D (device to device) is applied, the present invention can be efficiently applied.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings.

BEST MODE FOR INVENTION

Figure 1:
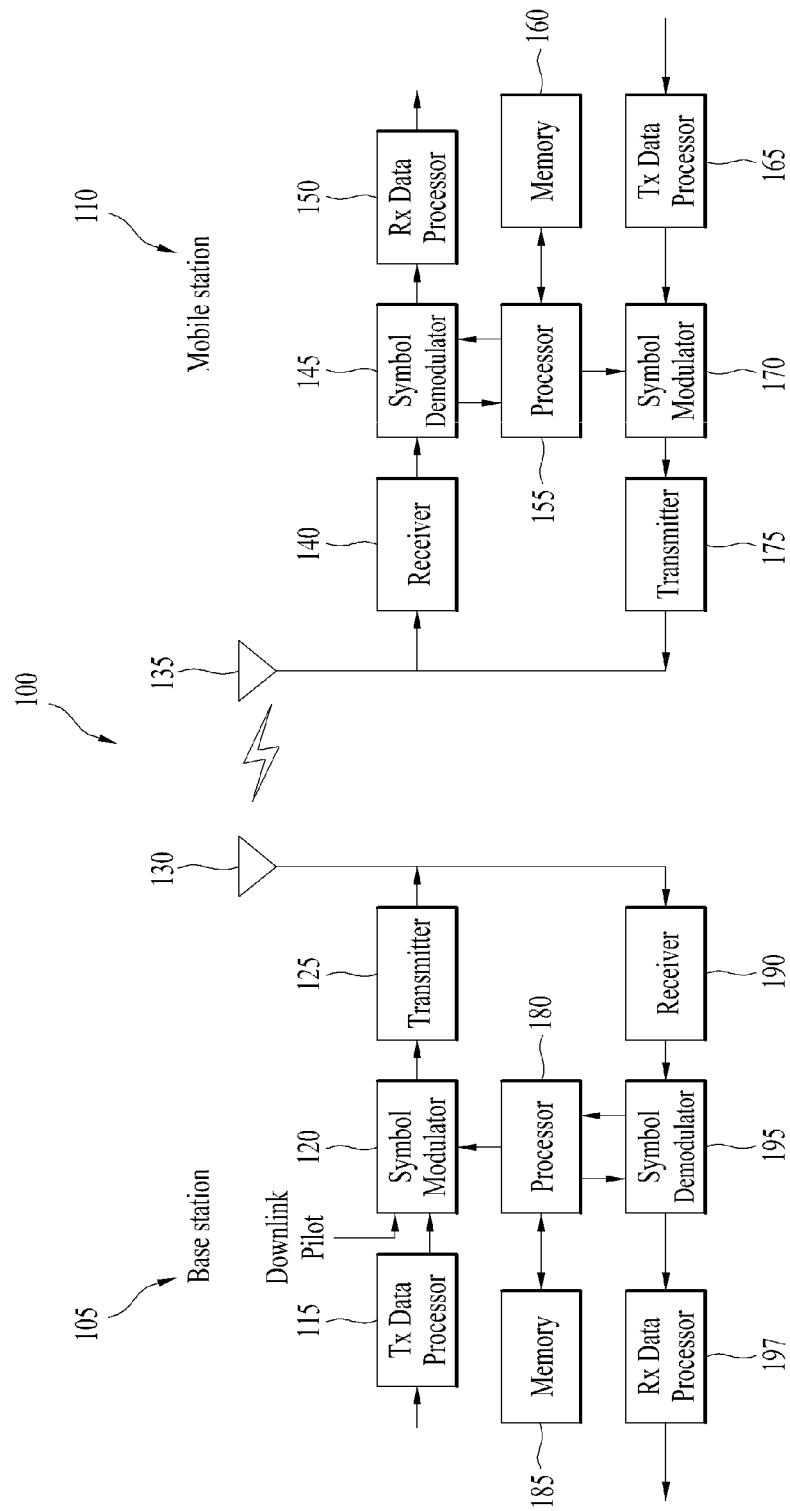
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP ($3^{rd}$ generation partnership project) LTE/LTE-A system, they are applicable to other random mobile communication systems except unique features of 3GPP LTE/LTE-A.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal or device is a common name of such a mobile or static user stage device as a user equipment (UE), a mobile station (MS), an advanced mobile station (AMS), and the like. And, assume that a base station is a common name of such a random node of a network stage communicating with a terminal as a Node B, an eNode B, a base station (BS), an access point (AP) and the like. Although the description of this specification is based on IEEE 802.16 system, the contents and technical idea of the present invention are applicable to various kinds of other communication systems.

In a mobile communication system, a user equipment can receive information in downlink from a base station and transmit information in uplink to the base station. The informations transmitted or received by the user equipment may include data and various control informations. And, various kinds of physical channels may exist in accordance with types and usages of the informations transmitted or received by the user equipment.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

Specific terminologies used for the following description may be provided to help the understanding of the present invention. And, the use of the specific terminology may be modified into another form within the scope of the technical idea of the present invention.

FIG. 1 is a block diagram for configurations of a base station 105 and a user equipment 110 in a wireless communication system 100.

Although one base station 105 and one user equipment 110 are shown in the drawing to schematically illustrate a wireless communication system 100, the wireless communication system 100 can include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 175, a transmitter 175, a transceiving antenna 135, a processor 155, a memory 160, a receiver 140, a symbol demodulator 155 and a received data processor 150. Although the base station/user equipment 105/110 includes one antenna 130/135 shown in the drawing, each of the base station 105 and the user equipment 110 includes a plurality of antennas. Therefore, each of the base station 105 and the user equipment 110 according to the present invention supports an MIMO (multiple input multiple output) system. And, the base station 105 according to the present invention can support both SU-MIMO (single user-MIMO) and MU-MIMO (multi user-MIMO) systems.

In the base station 105, the transmitter 125 and the receiver 190 can be replaced by a single transceiver. Likewise, in the user equipment 110, the transmitter 175 and the receiver 140 can be replaced by a single transceiver.

In downlink, the transmitted data processor 115 receives traffic data, performs coding on the received traffic data by formatting, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero (i.e., null). In each symbol duration, pilot symbols may be contiguously transmitted. In doing so, the pilot symbols may include symbols of frequency division multiplexing (FDM), orthogonal frequency division multiplexing (OFDM), time division multiplexing (CDM), or code division multiplexing (CDM).

The transmitter 125 receives the stream of the symbols, converts the received stream to at least one or more analog signals, additionally adjusts the analog signals (e.g., amplification, filtering, frequency upconverting, etc.), and then generates a downlink signal suitable for a transmission on a radio channel. Subsequently, the downlink signal is transmitted to the user equipment 110 via the transmitting antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, obtains data symbol estimated values (i.e., estimated values of the transmitted data symbols) by performing data demodulation on the received data symbols, and then provides the data symbol estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

Regarding the user equipment 110 in uplink, the transmitted data processor 165 provides data symbols by processing the traffic data. The symbol modulator 170 provides a stream of symbols to the transmitter 175 by receiving the data symbols, multiplexing the received data symbols, and then performing modulation on the multiplexed symbols. The transmitter 175 generates an uplink signal by receiving the stream of the symbols and then processing the received stream. The generated uplink signal is then transmitted to the base station 105 via the transmitting antenna 135.

In the base station 105, the uplink signal is received from the user equipment 110 via the receiving antenna 130. The receiver 190 obtains samples by processing the received uplink signal. Subsequently, the symbol demodulator 195 provides pilot symbols received in uplink and a data symbol estimated value by processing the obtained samples. The received data processor 197 reconstructs the traffic data transmitted from the user equipment 110 by processing the data symbol estimated value.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio interface protocol between a user equipment and a base station can be classified into $1^{st}$ layer (L1), $2^{nd}$ layer (L2) and $3^{rd}$ layer (L3) based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resources between UE and network. A user equipment and a base station may be able to exchange RRC messages with each other via a radio communication network using RRC layers.

In the present specification, the processor 155 of the user equipment 110 performs operations of processing signals and data except signal transceiving and storing functions of the user equipment 110. And, the processor 180 of the base station 105 performs operations of processing signals and data except signal transceiving and storing functions of the base station 105. Yet, for clarity, the processors 155 and 180 are not specially mentioned in the following description. Therefore, the processor 155 can perform a series of operations such as a data processing and the like other than the signal transceiving and storing functions, which may not be specially mentioned in the following description.

In TDD (time division duplex) system, while a specific user equipment is receiving a signal from a base station, if another user equipment, which is transmitting an uplink signal with a strength of a big signal, exists around the specific user equipment, it causes a problem that the specific user equipment may not be able to correctly receive the signal from the base station. In order to prevent such a problem from being caused, all cells should match an uplink timing with a downlink. Yet, since a transmission delay exists and differs depending on a size of a cell, a user equipment in a remote distance from a base station needs to transmit a signal in advance by a transmission delay time in consideration of a time for arriving at the base station. This transmission delay time is called a timing advance (TA).

Hence, in order to prevent a downlink signal and an uplink signal from overlapping with each other at a specific point, a guard time (or a guard interval) amounting to 2 TA, which is the value resulting from adding a downlink transmission delay time (TA) and an uplink timing advance (TA) to each other, should exist. To this end, a guard time exists in TDD system in consideration of a cell radius. For instance, a guard time of about 0.5 ms (supportive of a radius of 75 km) exists in 3GPP LTE system.

However, although such a guard time is necessary for a user equipment located in a cell edge area in case of a large cell, since most of TDD systems consider a case of a small cell radius, if the guard time is configured in TDD system, it may result in the waste of considerable resources. Aside from the problem of the resource waste, it is necessary to give the degree of freedom in accordance with a data traffic property of each cell. In doing so, since each cell should have a matched downlink/uplink (DL/UL) ratio, it is necessary to design a new TDD frame structure. In the following description, various embodiments of new TDD frame structures proposed by the present invention are explained with reference to the accompanying drawings.

$1^{st}$ Embodiment: TDD Frame Structure Design in Consideration of a Location of a User Equipment in a Cell A TDD frame structure according to a $1^{st}$ embodiment of the present invention relates to a new TDD frame structure in consideration of a location of a user equipment in a cell, thereby solving the problem of a related art TDD frame structure.

First of all, in case that a base station is aware of an approximate location of a user equipment in a cell, it is able to configure a frame in a manner that a guard time is not set up overall by coordinating a subframe available for each user equipment. For instance, since a user equipment located at a cell center can cover a DL transmission delay time and a UL transmission delay time (i.e., 2 TAs) in a CP (cyclic prefix) range, a guard time needs not to be given to user equipments located at the cell center close to the base station. On the other hand, a user equipment located at a cell edge can be implemented without a guard time if agreeing to not using a single UL subframe.

Figure 2:
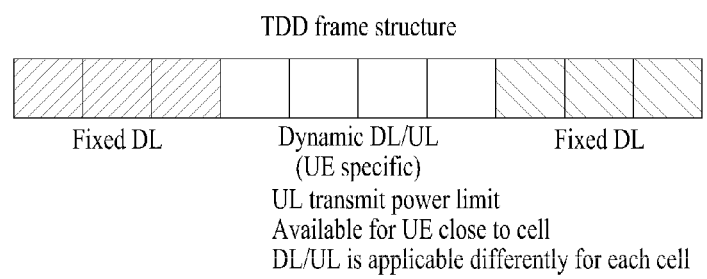
FIG. 2 is a diagram for one example of an improved TDD frame structure according to a $1^{st}$ embodiment of the present invention.

FIG. 2 is a diagram for one example of an improved TDD frame structure according to a $1^{st}$ embodiment of the present invention.

Referring to FIG. 2, a TDD frame may include a static (or fixed) DL subframe region (static DL), a static UL subframe region (static UL), and a dynamic DL/UL subframe (dynamic DL/UL).

Since each cell needs to match UL/UL timing for a user equipment located at a cell edge, a static (or fixed) (DL/UL) subframe region for the user equipment located at the cell edge is configured in a structure of the TDD frame and each cell is allowed to flexibly determine the rest of the TDD subframe structure by itself. Subsequently, if a user equipment mainly located at a cell center is scheduled in the dynamic DL/UL region (hereinafter abbreviated a dynamic region), it may be unnecessary for each cell to precisely match a DL/UL subframe ratio (i.e., a DL-to-UL subframe number ratio).

Moreover, since a transmission of low power will be mainly performed in a dynamic region by scheduling a user equipment mainly located at a cell center, each cell (i.e., a base station in the corresponding cell) just determines a DL/UL switching point at a random place in the dynamic region by itself. Thus, it is able to put restriction of a UL transmit power of a user equipment close to a base station in a manner of scheduling a user equipment mainly located at a cell center in a dynamic region.

Thus, in consideration of a user equipment location, user equipments located close to a base station are mainly scheduled in a dynamic region and a user equipment located at a cell edge is scheduled in a static DL/UL region, and a switching point from DL to UL is set in the dynamic region. Therefore, it is able to prevent the considerable resource waste due to the guard time assignment of the related art.

In the example shown in FIG. 2, 3 subframes are assigned to the static DL subframe region (static DL), 3 subframes are assigned to the static UL subframe region (static UL), and 4 subframes are assigned to the dynamic region (dynamic DL/UL). Alternatively, the number of subframes assigned to each of the regions is changeable.

$2^{nd}$ Embodiment: UE-Specific TDD Frame Structure in Consideration of Cell Radius and Location of User Equipment FIG. 3 is a diagram for one example of a specific frame structure per user equipment according to a $2^{nd}$ embodiment of the present invention.

For instance, in case of TD-LTE (time division-long term evolution), 1 frame amounts to 10 ms and a coverage decision by 150 km is possible for each 1 ms-subframe (or by 75 km in case of 0.5 ms-subframe). And, it is available within a CP range without a switching interval. In case of LTE normal CP (about 5 μs), it becomes about 1.4 km in aspect of transmission delay. And, it is able to cover a radius of about 400-500 m despite considering various margins.

A user equipment can report its TA to a base station. In doing so, the user equipment decides a TA range instead of a specific value and may report the decided TA range to the base station. Alternatively, the user equipment may report the number of unavailable subframes based on TA. Such a reporting can be performed if the TA exceeds a predetermined threshold or becomes equal to or smaller than the predetermined threshold. Alternatively, such a report can be performed periodically. Based on the TA relevant content reported by the user equipment, the base station schedules the user equipment and adjusts a timing. Moreover, the base station can inform the user equipment of information on the number of available subframes.

Figure 3:
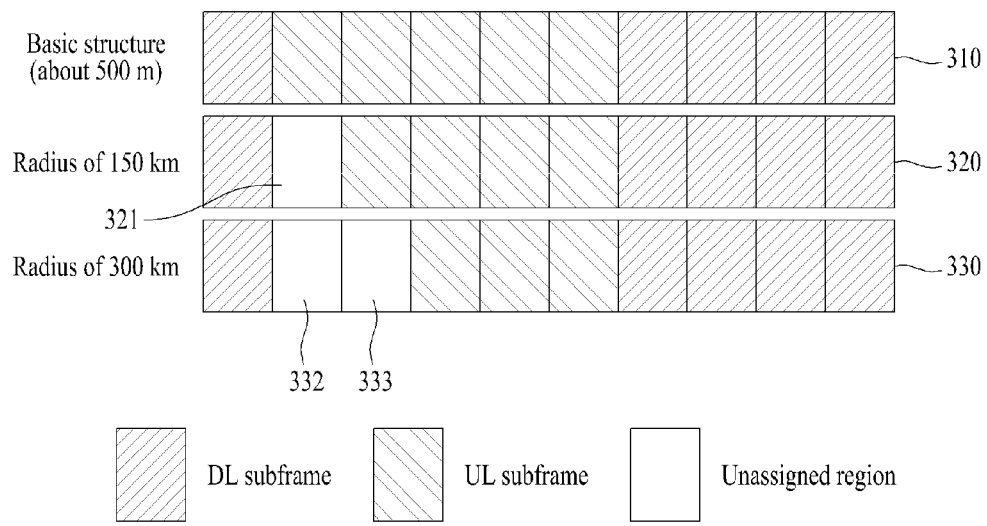
FIG. 3 is a diagram for one example of a specific frame structure per user equipment according to a $2^{nd}$ embodiment of the present invention.

Like the example of a frame structure 310 shown in FIG. 3, a base station can design a TDD frame structure with reference to a cell radius if 500 m. In particular, a $1^{st}$ subframe may be configured as a DL subframe, 5 subframes next to the $1^{st}$ subframe may be configured as UL subframes, and 4 subframes next to the UL subframes as DL subframes again. In this case, an unassigned region does not exist in case of a cell radius of about 500 m. Hence, the base station can schedule a user equipment located within the cell radius of about 500 m in accordance with the frame structure 310.

A frame structure 320 shown in FIG. 3 illustrates a case that a TDD frame structure convers a radius of about 150 km. Based on the TA reported by a user equipment located in a radius of about 150 km, a base station can schedule a $1^{st}$ UL subframe interval 321 as an assigned region. In this case, the number of UL subframes available for the user equipment located within the radius of about 150 km is decreased into 4.

A frame structure 330 shown in FIG. 3 illustrates a case that a TDD frame structure convers a radius of about 300 km. Based on the TA reported by a user equipment located in a radius of about 300 km, a base station can schedule a $1^{st}$ UL subframe interval 331 and a $2^{nd}$ UL subframe interval 333 as assigned regions. In this case, the number of UL subframes available for the user equipment located within the radius of about 300 km is decreased into 3.

Thus, it is able to design a UE-specific TDD frame structure in consideration of a location of a user equipment and a cell radius.

$3^{rd}$ Embodiment: Generalization of $2^{nd}$ Embodiment

Figure 4:
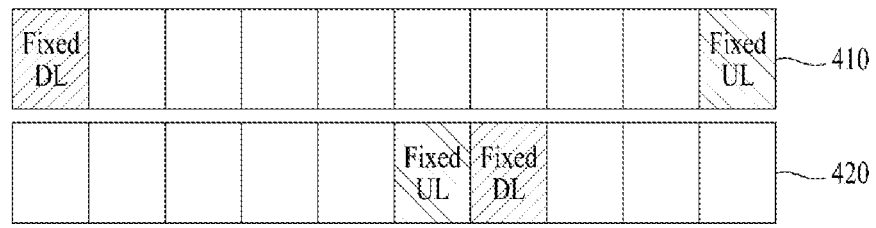
FIG. 4 is a diagram for one example of a TDD frame structure according to a $3^{rd}$ embodiment of the present invention.

FIG. 4 is a diagram for one example of a TDD frame structure according to a $3^{rd}$ embodiment of the present invention.

A $3^{rd}$ embodiment of the present invention can design a TDD frame structure 410/420 shown in FIG. 4 by further generalizing the above-described $2^{nd}$ embodiment. The static DL/UL subframe region (static DL/UL) in the former frame structure 310/320/330 according to the $2^{nd}$ embodiment of the present invention is arranged as shown in FIG. 4 for example and the rest of the regions can be used in a manner of being determined for each base station. Like the frame structure 410, a $1^{st}$ subframe may be assigned as a static DL subframe and a last subframe may be assigned as a static UL subframe. Like the frame structure 420, a static UL subframe and a static DL subframe may be configured adjacent to each other. For example, a $6^{th}$ subframe may be assigned as a static UL subframe and a $7^{th}$ subframe may be assigned as a static DL subframe.

The rest of the regions except the static DL/UL subframe region may be usable appropriately in accordance with a TA for each user equipment. In case that a UL subframe is switched to a DL subframe, since a delay amounting to 2 TAs exists, there is no interference in-between.

On the other hand, a base station determines a maximum transmit power in each UL subframe and then enables a corresponding user equipment to use the corresponding power. For instance, in case that a DL subframe to UL subframe ratio (DL/UL) is 6:4, when a transmit (Tx) power limit is determined for 4 UL subframes, a value (e.g., MAX=20 dBm) determined in a cell is determined for a static UL subframe (static UL) and the transmit power limit may be attenuated for the rest of UL subframes by a unit of 1 dB. The base station can signal the value of MAX 20 dBm to the user equipment by RRV (radio resource control) signaling.

If the attenuation for UL subframes is set to −3, −2, −1 and 0, a user equipment can perform transmissions with 17 dBm, 18 dBm, 19 dBm and 20 dBm in the corresponding subframes, respectively. The values according to such attenuation may be signaled by a base station to a user equipment through a broadcast channel (BCH) or the like.

Unlike the case of limiting a maximum transmit power for each UL subframe, a base station may indicate the number (e.g., 1, 2, 3, 4) of allowable UL subframes with reference to a current transmit power of a user equipment.

On the other hand, when base stations share DL-to-UL subframe (DL/UL) ratio information with each other, it is able to determine a maximum transmit power reference based on the shared information. For instance, in case that all neighbor base stations use at least two UL subframes, last 2 UL subframes may be set available with a maximum power. Moreover, if a rate for each base station to use a specific subframe as a DL subframe is high, a transmit power limit in the corresponding specific subframe may be set high.

This improved TDD subframe structure is applicable to a heterogeneous network (HetNet) as well. In a heterogeneous network, for the rest of regions except the static region in FIG. 4, a small cell have a configuration of its own by referring to a TDD frame configuration of a macro cell. With reference to a UL subframe maximum transmit power in a macro cell, a small cell can check whether a transmission in downlink is possible in a corresponding subframe. Moreover, in accordance with a DL transmit power received by a macro cell, it is able to check whether a corresponding subframe is available for a DL or UL in a small cell.

Accordingly, a resource can be efficiently used for each cell in accordance with a design of an improved TDD frame structure according to the various embodiments of the present invention mentioned in the foregoing description. And, a scheduling is performed with reference to a TDD frame structure in a neighbor cell (heterogeneous network included), whereby a communication can be efficiently performed.

Generally, a frame structure of a mobile communication system has a static structure and is configured through a centralized scheduling of a base station. In this case, although a control of interference and the like may be facilitated, efficiency is considerably lowered to an inflexible frame structure. Particularly, when a multitude of small cells exist like HetNet, if inter-cell use pattern differs due to the small number of users per cell or such a new distributive communication method as D2D (device to device) is applied, a corresponding efficiency is considerably lowered as well. Moreover, although the same resource may be usable in regionally separated places, it may become difficult to apply this method.

In the following description, a new frame structure for enabling a more flexible scheduling based on a minimum static frame structure is proposed.

4th Embodiment: New Frame Structure Proposed in Consideration of Inter-Cell Use Pattern and Distributive Communication Method Such as D2D Communication FIG. 5 is a diagram for one example of a frame structure 500 according to a 4th embodiment of the present invention.

Figure 5:
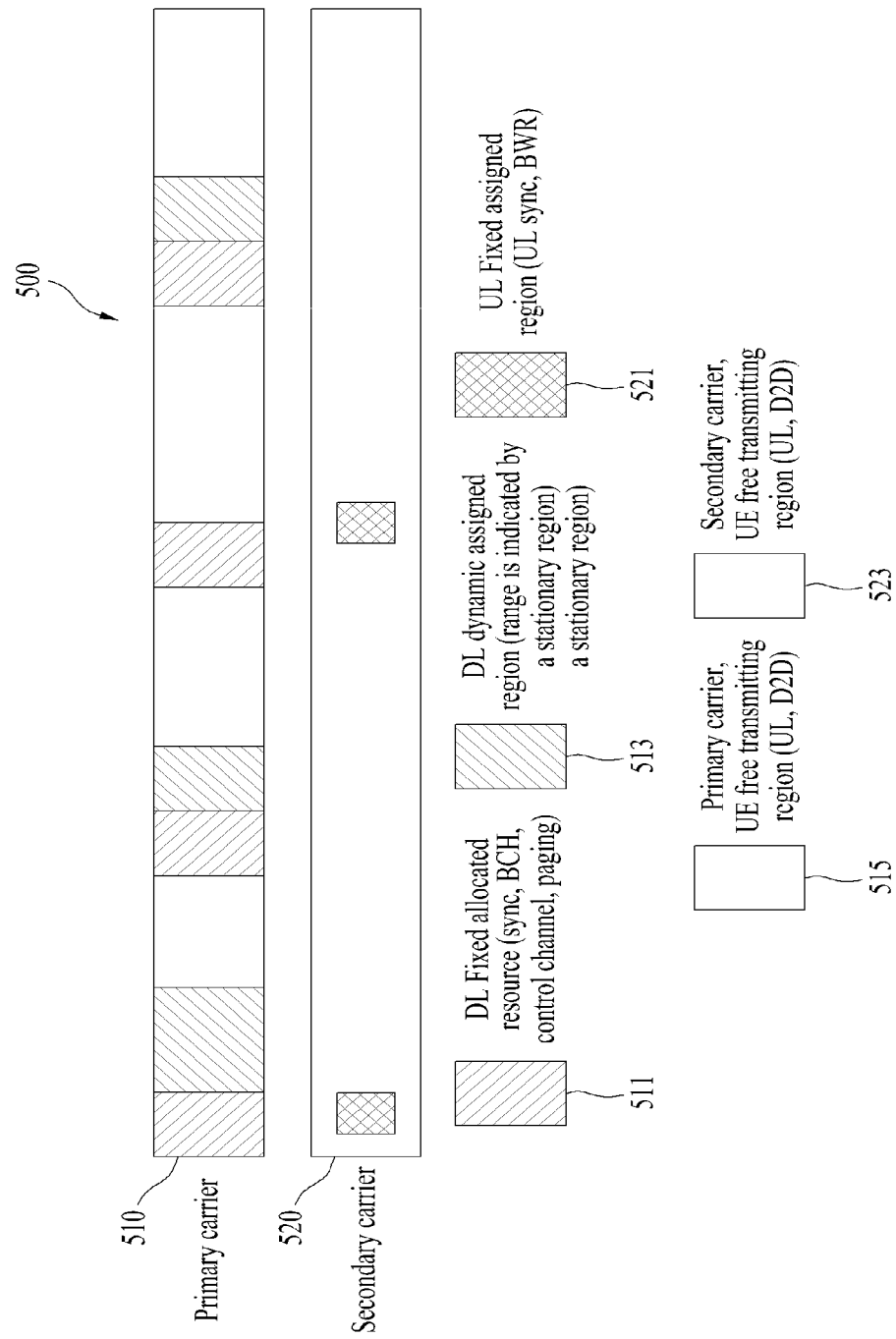
FIG. 5 is a diagram for one example of a frame structure 500 according to a $4^{th}$ embodiment of the present invention.

Referring to FIG. 5, a frame structure 500 may include multiple carriers (e.g., a primary carrier, a secondary carrier, etc.). In this case, a carrier may be called a carrier component or a cell. The primary carrier and the secondary carrier may be assigned in a manner of differing from each other in frequency band.

The frame structure 500 includes a frame structure 510 of the primary carrier and a frame structure 520 of the secondary carrier. And, the frame structure of each of the carriers may include a scheduling region and a free region.

Generally, a DL/UL static assignment region (or resource), which is assigned periodically and statically, exists in the frame structure 500. In particular, regarding the frame structure 510 of the primary carrier, a DL static assignment region 511 exists in the frame structure 510 of the primary carrier. The DL static assignment region 511 may be assigned to a static time/frequency interval. A base station can transmit a sync channel, a control channel a paging signal, an information on a DL dynamic assigned region and the like to a user equipment via the DL static assignment region 511. Meanwhile, DL/UL may be flexibly assigned to the rest of regions in the primary carrier 510 except the DL static assignment region 511. Particularly, a DL dynamic assigned region 513, which can be dynamically assigned, may exist in the primary carrier 510. And, the base station can transmit information on the DL dynamic assigned region 513 via the DL static assignment region 511. The DL dynamic assigned region 513 is the region in which a range can be changed in accordance with a scheduling of the base station. The information on the DL dynamic assigned region 513 may include a range, size and resource index of the DL dynamic assigned region and the like. The user equipment can obtain positions of time and frequency resources of the DL dynamic assigned region based on the DL dynamic assigned region information received via the static assignment region 511.

In the frame structure of the primary carrier 510, the rest region 515 except the DL static assignment region 511 and the DL dynamic assigned region 513 is a UL region and may correspond to a free transmitting region of a user equipment. In the UE free transmitting region 515, a base station always operates in a receiving mode. The UE free transmitting region 515 is the region for a UL transmission to a base station from a user equipment or the region for transmitting signals between D2D user equipments capable of direct communications between user equipments.

In the frame structure of the primary carrier 510, a transmission/reception switching of a user equipment may be performed using a CP (cyclic prefix) or is possible for a time gap determined for each user equipment.

Referring to FIG. 5, in the frame structure 520 of the secondary carrier, a UL static assignment region 521 and a UE free transmitting region 523 exist. The UL static assignment region 521 is the region statically assigned for a UL transmission of a user equipment. The user equipment can match a UL sync signal through the UL static assignment region 521 and can transmit a bandwidth request signal via the UL static assignment region 521. The UE free transmitting region 523 is the region for a UL transmission to a base station from a user equipment or the region for transmitting signals between D2D user equipments capable of direct communications between user equipments.

In case of UL, since a resource is occupied by assignment of the base station, another user equipment is unable to use the occupied resource. In case of UL, if a base station assigns a resource to a specific user equipment and then informs the specific user equipment of the assignment, only the specific user equipment occupies the allocated resource and is then able to transmit a signal via the occupied resource. Yet, another user equipment may perform a D2D transmission with a low power via a region assigned by the base station.

Meanwhile, in case of UL, a user equipment successful in a ranging signal may be able to transmit a UL signal via a resource mapped to a resource for transmitting the ranging signal.

Figure 6:
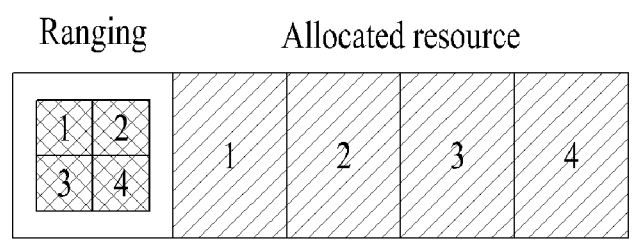
FIG. 6 is a diagram for one example to describe a transmitting method in a UE free transmitting region of a secondary carrier.

FIG. 6 is a diagram for one example to describe a transmitting method in a UE free transmitting region of a secondary carrier.

Referring to FIG. 6, after a ranging signal mapped to time and frequency resources of the UE free transmitting region 523 has been prepared, if a user equipments is successful in a ranging, the user equipment may be enabled for a UL transmission. In particular, the user equipment transmits a ranging signal via a specific region (denoted by 1) of the UE free transmitting region 523. If the ranging signal is successfully transmitted, the UL transmission can be performed via a region (i.e., an interval denoted by 1 among the regions described as assigned regions in FIG. 6) corresponding to the specific region 1.

Meanwhile, although a signal may be transmitted via a UE dedicated UL region in a manner of raising a transmit power, a maxim transmit power may be limited for other regions. A base station may perform a transmission of a signal via a UL region but should perform the transmission with a small output of power.

5th Embodiment: Modification of 4th Embodiment

Figure 7:
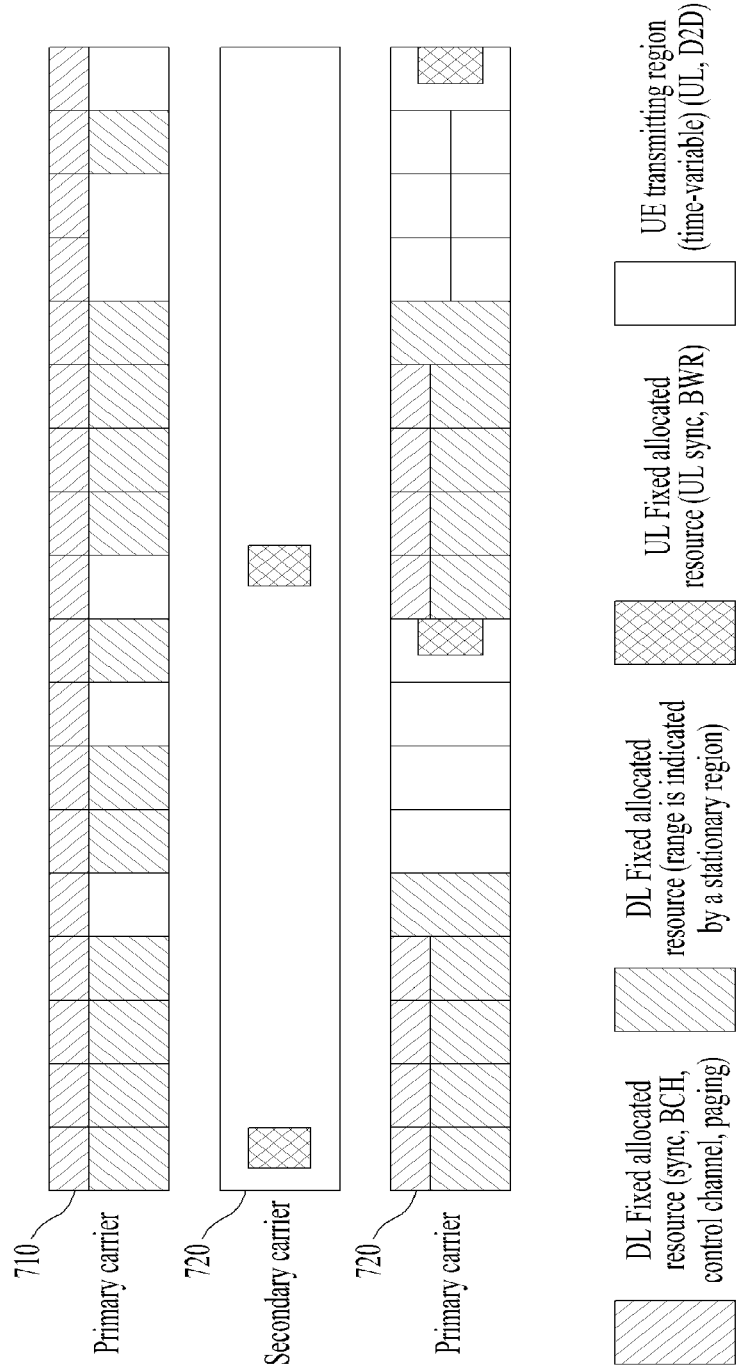
FIG. 7 is a diagram for one example of a frame structure 700 according to a $5^{th}$ embodiment of the present invention.

FIG. 7 is a diagram for one example of a frame structure 700 according to a 5th embodiment of the present invention.

The former embodiment described with reference to FIG. 5 or FIG. 6 may have a considerable transmission delay if a transmission occurs by a frame unit. Hence, in order to reduce the transmission delay, after a static region and a dynamic region have been designated not by TDM (time division multiplexing) shown in FIG. 5 but by FDM (frequency division multiplexing), a transmission may be determined each subframe.

Referring to FIG. 7, in a frame structure 710 of a primary carrier, a DL static assignment region and a DL dynamic assigned region are assigned by FDM. Moreover, a UE free transmitting region may be assigned by FDM together with the DL static assignment region.

A frame structure 720 of a secondary carrier is similar to the former frame structure 520 of the secondary carrier shown in FIG. 5. On the other hand, in a frame structure 730 of a new primary carrier, DL static allocated resource may be assigned to a whole specific subframe only and a UL static assignment region may be further included in a UE free transmitting region. In the frame structure 730 of the new primary carrier, the UL static assignment region may be located in a manner of being assigned to a partial region of the UE free transmitting region.

6th Embodiment: Modification of 4th Embodiment

Figure 8:
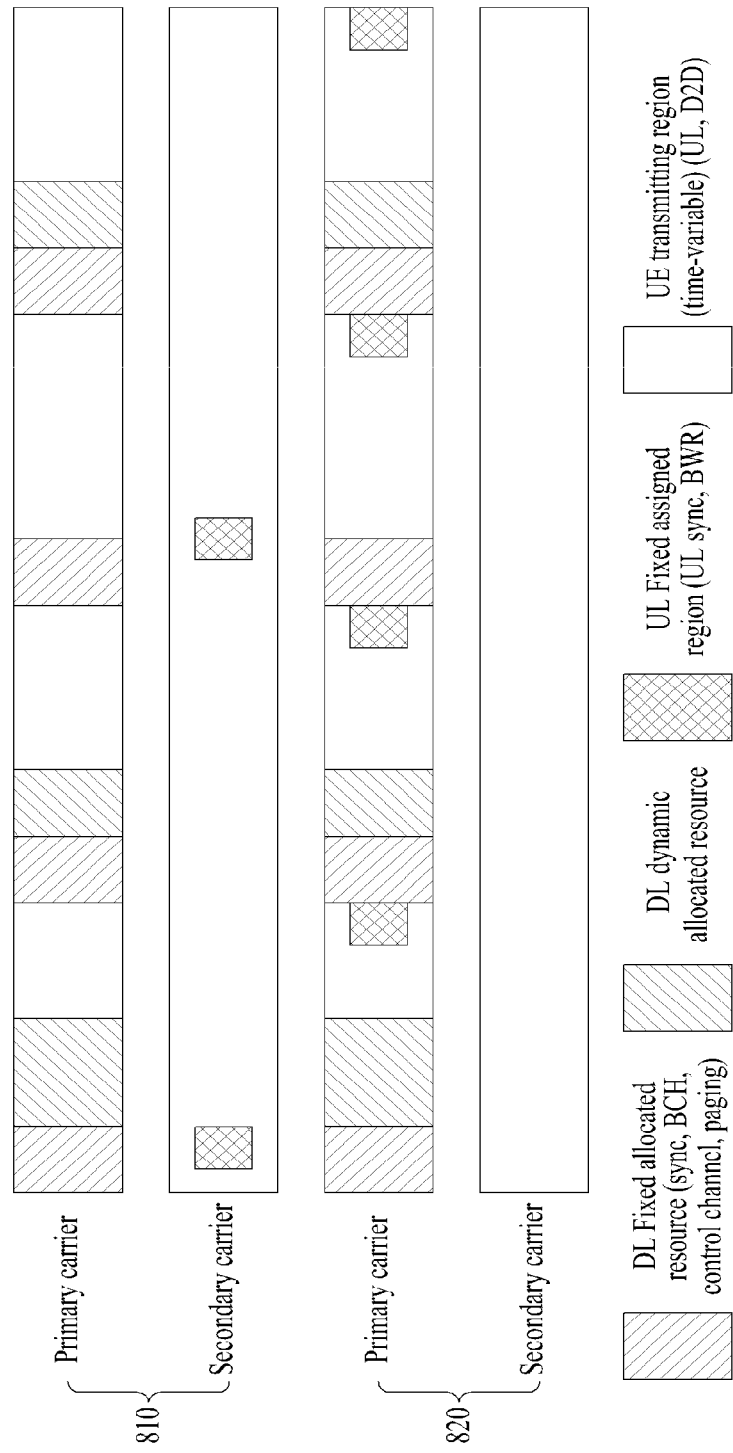
FIG. 8 is a diagram for one example of a frame structure according to a $6^{th}$ embodiment of the present invention.

FIG. 8 is a diagram for one example of a frame structure according to a 6th embodiment of the present invention.

Referring to FIG. 8, a frame structure according to a 6th embodiment of the present invention corresponds to a hybrid frame structure in which TDM and FDM are mixed. And, the frame structure according to the 6th embodiment of the present invention may be illustrated as one of two types 810 and 820.

In a frame structure 810, a DL static assignment region, a DL dynamic assigned region and a UE free transmitting region (or a UE transmitting region) may be assigned to a primary carrier by TDM. In a secondary carrier, a UE free transmitting region is assigned. In the secondary carrier, a partial region may be assigned as a UL static assignment region. In this case, the UL static allocated resource is arranged in the middle of a band (e.g., a vertical axis in FIG. 8) of the secondary carrier, whereby interference with a neighbor band can be minimized.

In a frame structure 820, like the former frame structure 810, a DL static assignment region, a DL dynamic assigned region and a UE free transmitting region (or a UE transmitting region) may be assigned by TDM. And, a portion of the UE free transmitting region may be assigned as a UL static assignment region. In a secondary carrier, a UE free transmitting region is assigned only but a UL static assignment region is not assigned. As mentioned in the foregoing description of the former frame structure 810, the UL static assignment region in a primary carrier is arranged in the middle of a band (e.g., a vertical axis in FIG. 8) of the secondary carrier, whereby interference with a neighbor band can be minimized.

7th Embodiment: Frame Structure for Inter-Cell Interference Avoidance

Figure 9:
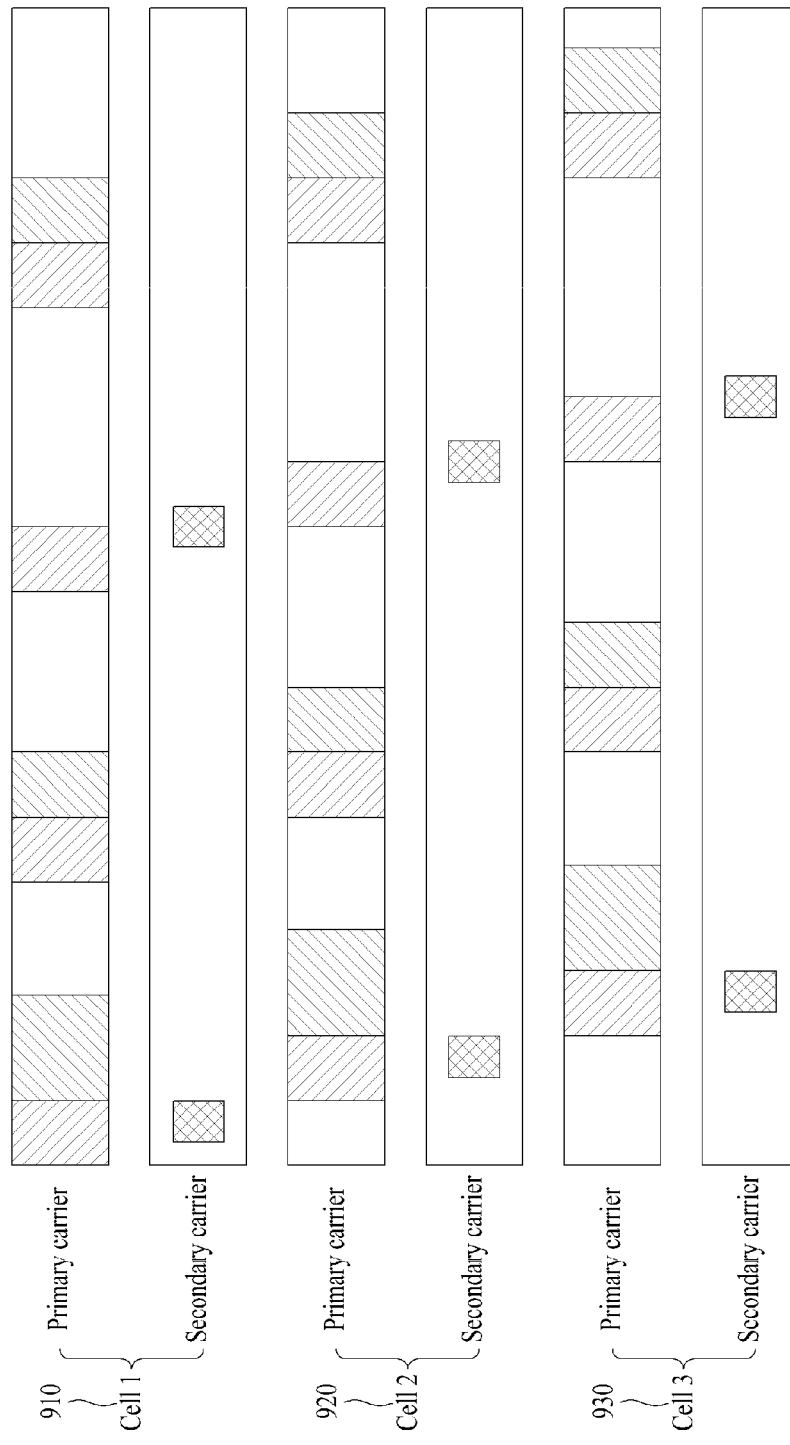
FIG. 9 is a diagram for one example of a frame structure for inter-cell interference avoidance according to a $7^{th}$ embodiment of the present invention.

FIG. 9 is a diagram for one example of a frame structure for inter-cell interference avoidance according to a 7th embodiment of the present invention.

Referring to FIG. 9, it is able to design different frame structures for cells in order to eliminate interference between neighbor cells (e.g., Cell 1, Cell 2 and Cell 3).

Each of the frame structures 910, 920 and 930 of Cell 1, Cell 2 and Cell 3 is identical to the former frame structure 810 described with reference to FIG. 8. In particular, in each of the frame structures 910, 920 and 930 of the cells, a DL static assignment region, a DL dynamic assigned region and a UE free transmitting region (or a UE transmitting region) may be assigned to a primary carrier by TDM. In a secondary carrier, a UE free transmitting region is assigned. In the secondary carrier, a partial region may be assigned as a UL static assignment region.

In doing so, for inter-cell interference avoidance, in the frame structure of each of the cells, the DL static assignment regions of the cells may be assigned in a manner of not overlapping with each other in a time domain. Moreover, in the frame structure of each of the cells, the UL static assignment region is assigned in the middle of a band of a secondary carrier for the avoidance of interference with a neighbor band. Alternatively, for the avoidance of interference between neighbor cells, the UL static assignment regions of the cells may be assigned in a manner of not overlapping with each other in the time domain.

Thus, by differentiating the static assignment region for each cell by TDM, a small cell of HetNet can have a position different from that of an overlay macro cell (differing from a neighbor cell as well), whereby interference can be minimized. A user equipment can receive a significant control signal such as a control channel, a sync channel, a paging and the like via the DL static assignment region at a timing different in accordance with a frame structure assigned for each cell and is able to transmit such a significant signal as a UL sync signal, a bandwidth request signal and the like to a base station via the UL static assignment region assigned at a timing different for each cell.

In the following description, a method of coordinating a transmit power per assigned region in the frame structure proposed in the foregoing description is explained.

8th Embodiment: Transmit Power Coordinating Method in a Propose Frame Structure

Figure 10:
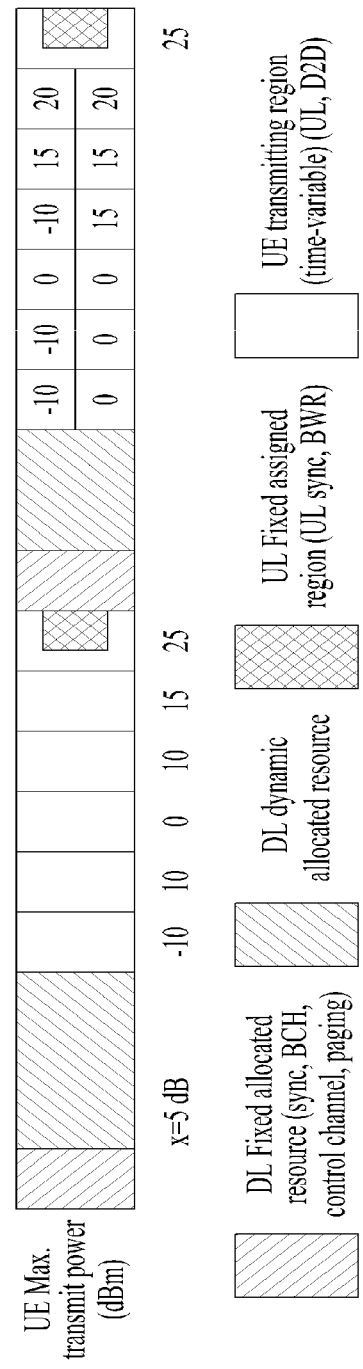
FIG. 10 is a diagram for one example of a method of coordinating a transmit power per assigned region in a frame structure according to an $8^{th}$ embodiment of the present invention.

FIG. 10 is a diagram for one example of a method of coordinating a transmit power per assigned region in a frame structure according to an 8th embodiment of the present invention.

Referring to FIG. 10, a base station can fix a maximum power of a user equipment by a unit of specific size (e.g., x dB) per subframe for the rest of resources except a transmitting subframe. This maximum power information of the user equipment is broadcasted to user equipments by each cell (or base station). And, the corresponding user equipment is allowed to transmit a signal with a power equal to or smaller than the corresponding size based on the maximum power information.

In the example shown in FIG. 10, maximum power values (e.g., −10 dB, 0 dB, 10 dB, 15 dB and 25 dB) differing from each other can be set for the intervals in a UE free transmitting region, respectively. Moreover, a different maximum power value may be set for each subchannel (or RB) in a subframe as well. In this case, a base station can inform a user equipment of information on the different maximum power value for each subchannel (or RB) via such a control channel indicating a UL region as a physical downlink control channel (PDCCH) and the like.

Meanwhile, a base station sets a power level (e.g., Y dB) corresponding to a guaranteed level and a user equipment can determine a power level of a transmitted signal with reference to RSCP (received signal code power) or RSSI (received signal strength indicator) of its own. Let's consider Formula 1 for example.

$$P\_TX = P\_RX(\text{Path\_loss reflected}) + \text{Delta(margin)}$$

$$P\_TX(dB) = -70 \text{ dBm} + 80 \text{ dB} = 10 \text{ dB} \qquad \text{[Formula 1]}$$

In Formula 1, 'Delta' indicates a parameter related to a transmitted distance. The delta value is available for coordination of interference with a neighbor cell. The higher the delta value gets, the stronger a signal transmitted by a user equipment at a cell edge becomes. In aspect of the user equipment, the delta value is usable in determining a transmission radius.

Referring to Formula 1, a user equipment can consider a received power level 'P_RX (Path_loss reflected)' and a delta value as factors for determining a UL transmit power. The user equipment can obtain the received power level via RSCP, RSSI or the like. In order to determine the delta value, the user equipment may consider a transmission distance or information on interference with a neighbor cell. The user equipment can determine the UL transmit power by applying the determined delta value and the 'P_RX (Path_loss reflected)' to Formula 1.

Accordingly, the present invention can efficiently control the inter-cell interference in accordance with the designs of the various frame structures including the above-described frame structure for the inter-cell interference avoidance. Particularly, when a multitude of small cells exist like HetNet, as the number of users per cell is decreased, if an inter-cell use pattern is different or such a new distributive communication method as D2D (device to device) is applied, the present invention can be efficiently applied.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

An apparatus for transceiving signals in accordance with a frame structure supportive of a plurality of carriers in a wireless communication system and method thereof are industrially applicable to various kinds of mobile communication systems including 3GPP LTE, 3GPP LTE-A, IEEE 802 and the like.

The invention claimed is:

1. A method of transceiving signals by a user equipment in accordance with a frame structure of a cell in a wireless communication system, the method comprising:
transceiving the signals using a first carrier and a second carrier in accordance with the frame structure of the cell,
wherein the first carrier comprises a fixed downlink assignment region, an uplink assignment region, and a dynamic downlink assignment region,
wherein a resource index of the dynamic downlink assignment region is indicated by the fixed downlink assignment region,
wherein the resource index of the dynamic downlink assignment region is changeable, and
wherein the second carrier comprises only the uplink assignment region;
receiving, from a base station, information including each maximum transmission power value corresponding to each resource block (RB) of a subframe of the uplink assignment region, each RB of the subframe having a different maximum transmission power value; and
transmitting a signal through the corresponding RB of the subframe of the uplink assignment region based on a transmission power value, the transmission power value being equal to or smaller than the maximum transmission power value of the corresponding RB.

2. The method of claim 1, wherein the frame structure of the cell is different from a frame structure of a neighboring cell.

3. The method of claim 1, wherein the uplink assignment region of the second carrier comprises a static assignment region.

4. The method of claim 1, wherein the uplink assignment region of the second carrier comprises a device-to-device (D2D) communication region.

5. The method of claim 1, wherein the first carrier corresponds to a primary carrier and the second carrier corresponds to a secondary carrier.

6. A user equipment for transceiving signals in accordance with a frame structure of a cell in a wireless communication system, the user equipment comprising;
a transceiver; and
a processor,
wherein the processor is configured to control that the transceiver to transceive the signals using carrier first carrier and a second carrier in accordance with the frame structure of the cell,
wherein the first carrier comprises a fixed downlink assignment region, an uplink assignment region, and a dynamic downlink assignment region,
wherein a resource index of the dynamic downlink assignment region is indicated by the fixed downlink assignment region,
wherein the resource index of the dynamic downlink assignment region is changeable,
wherein the second carrier comprises only the uplink assignment region,
wherein the processor is configured to control the transceiver to receive, from a base station, information including each maximum transmission power value corresponding to each resource block (RB) of a subframe of the uplink assignment region, each RB of the subframe having a different maximum transmission power value, and
wherein the processor is configured to control the transceiver to transmit a signal through the corresponding RB of the subframe of the uplink assignment region based on a transmission power value, the transmission power value being equal to or smaller than the maximum transmission power value of the corresponding RB.

7. The apparatus of claim 6, wherein the frame structure of the cell is different from a frame structure of a neighboring cell.

8. The apparatus of claim 6, wherein the uplink assignment region of the second carrier comprises an uplink static assignment region.

9. The apparatus of claim 6, wherein the uplink assignment region of the second carrier comprises a device-to-device (D2D) communication region.

10. The apparatus of claim 6, wherein the first carrier corresponds to a primary carrier and the second carrier corresponds to a secondary carrier.

11. The method of claim 1, wherein the transceiving further comprises transceiving the signals through the dynamic downlink assignment region based on the resource index.

12. The apparatus of claim 6, wherein the processor is configured to control the transceiver to transceive the signals through the dynamic downlink assignment region based on the resource index.

* * * * *